US012671541B2

(12) United States Patent
Dehmas

(10) Patent No.: US 12,671,541 B2
(45) Date of Patent: Jun. 30, 2026

(54) METHOD AND DEVICE FOR SYNCHRONIZING A TELECOMMUNICATIONS RECEIVER DEVICE RECEIVING AN IMPULSE RADIO ULTRA-WIDEBAND SIGNAL

(71) Applicant: COMMISSARIAT A L'ENERGIE ATOMIQUE ET AUX ENERGIES ALTERNATIVES, Paris (FR)

(72) Inventor: François Dehmas, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/917,934

(22) Filed: Oct. 16, 2024

(65) Prior Publication Data

US 2025/0132877 A1      Apr. 24, 2025

(30) Foreign Application Priority Data

Oct. 18, 2023      (FR) ...................................... 2311266

(51) Int. Cl.
| | |
|---|---|
| *H04L 5/00* | (2006.01) |
| *H04L 27/26* | (2006.01) |
| *H04W 56/00* | (2009.01) |

(52) U.S. Cl.
CPC ........ *H04L 5/0048* (2013.01); *H04L 27/2692* (2013.01); *H04W 56/00* (2013.01)

(58) Field of Classification Search
CPC ........... G01S 3/48; G07C 9/00; H04B 1/7183; H04B 17/391; H04J 7/00; H04J 11/00;

(Continued)

(56) References Cited

U.S. PATENT DOCUMENTS

| | | | |
|---|---|---|---|
| 2018/0254870 A1* | 9/2018 | Dutz ..................... | H04L 5/0051 |
| 2022/0140971 A1* | 5/2022 | Hammerschmidt .. | H04L 5/0092 370/329 |

(Continued)

OTHER PUBLICATIONS

Erseghe, et al., "Performance of UWB Impulse Radio in strong MAI with frequency offsets estimation", 2008 IEEE International Conference on Ultra-Wideband, vol. 1, pp. 213-216, Oct. 2008.

*Primary Examiner* — Shawkat M Ali
(74) *Attorney, Agent, or Firm* — BakerHostetler

(57) ABSTRACT

A method for synchronizing in a receiver an IR-UWB signal including data packets having a first preamble portion of at least two sequences of N pulses spaced by period T and each equal to a reference pulse weighted by a complex coefficient $c_n$, n=0 to N−1 indicating the rank of the pulse in the first sequence, and a second preamble portion of at least two sequences equal to the complex conjugate of the first sequence, includes: considering NP successive samples $s_n$, for n=0 to NP−1, of a slice, of duration NT, of the first and respectively second preamble portion of a received packet, determining the sequence of values $$x_n = c^*_{\lfloor \frac{n}{P} \rfloor} s_n,$$

and respectively the sequence of values $$y_n = c_{\lfloor \frac{n}{P} \rfloor} z_n,$$

with $T_s$ the sampling period $T=P \times T_s$; determining the frequency $f_d$ and $f_g$ of the sequence $x_n$ and $y_n$, respectively; and computing shift $\Delta f$ applied to synchronize to the received signal.

10 Claims, 4 Drawing Sheets

(58) Field of Classification Search
CPC . H04L 5/00; H04L 5/0048; H04L 7/04; H04L
25/02; H04L 27/00; H04L 27/26; H04L
27/2692; H04L 45/74; H04W 56/00;
H04W 72/04
USPC ................ 375/219, 260, 262, 267, 295, 316
See application file for complete search history.

(56) References Cited

U.S. PATENT DOCUMENTS

2022/0407765  A1     12/2022  Dehmas
2024/0291514  A1*     8/2024  Saban  ................... H04B 1/7183

* cited by examiner

METHOD AND DEVICE FOR SYNCHRONIZING A TELECOMMUNICATIONS RECEIVER DEVICE RECEIVING AN IMPULSE RADIO ULTRA-WIDEBAND SIGNAL

CROSS-REFERENCE TO RELATED APPLICATION

This application claims priority to foreign French patent application No. FR 2311266, filed on Oct. 18, 2023, the disclosure of which is incorporated by reference in its entirety.

FIELD OF THE INVENTION

The invention relates to the field of telecommunications and radiolocation. More particularly, it relates to IR-UWB signals (IR-UWB standing for standing for impulse radio ultra-wideband). Such a signal is transmitted by a transmitter device. The receiver device receiving the transmitted signal must synchronize itself in time and frequency to the transmitted signal in order to be able to demodulate the transmitted signal and carry out the processing required to decode the transmitted message and/or to extract information from the physical signal to estimate distance, angle of arrival or location.

BACKGROUND

By synchronization, what is meant is alignment, by the receiver device, of its clock with:

- the same frequency (frequency synchronization), and possibly the same phase;
- the same time origin (time synchronization) as that of the transmitter shifted by the propagation time of the signal from the transmitter to the receiver.

In IR-UWB, synchronization is achieved by virtue of the preamble that starts the transmitted packet. This preamble is generally made up of symbols formed from a sequence, as in the various physical IR-UWB layers of the IEEE802.15.4 standard (cf. "IEEE Standard for Low-Rate Wireless Networks" in IEEE Std 802.15.4-2020 (Revision of IEEE Std 802.15.4-2015), vol., no., pp. 1-800, Jul. 23, 2020). These sequences are formed from binary elements (+1; −1) or ternary elements (+1; 0; −1) that weight the pulses. The symbol is then repeated a plurality of times in the preamble.

Synchronization is in particular achieved by way of a correlation between the received signal and a preamble symbol. The position of the obtained correlation peaks makes it possible to achieve temporal synchronization. The greater the desire for synchronization at low signal-to-noise ratios (SNR) (for example, to achieve a long range), the longer the sequences to be used in the correlations must be. However, the transmitter and the receiver are not perfectly synchronized in frequency either and this difference limits the duration of the correlation: if the phase rotation over a symbol is too great, the accumulation of the pulses ends up being destructive. Non-coherent accumulations may be employed to overcome this problem, but then the processing improvement is less than with coherent accumulations.

There is therefore a need to achieve a synchronization that is low-SNR (and that therefore uses long sequences, and that gives rise to the accumulation of a high number of pulses) in the presence of conventional levels of central frequency offset (CFO).

SUMMARY OF THE INVENTION

To this end, according to a first aspect, the present invention describes a method for synchronizing a telecommunications receiver device receiving an impulse radio ultrawide-band signal comprising data packets, a data packet comprising a preamble, said method comprising a step of synchronizing the receiver device to the received signal depending on said preamble, said method being characterized in that the following steps are implemented by the telecommunications receiver device, the preamble comprising a first preamble portion of at least two occurrences of a first preamble sequence of N pulses spaced apart by a period T and that are each equal to a reference pulse weighted by a complex coefficient $c_n$, n=0 to N−1 indicating the rank of the pulse in the first sequence, said preamble further comprising a second preamble portion of at least two occurrences of a second preamble sequence equal to the complex conjugate of the first sequence:

i/ sampling the preamble with a sampling period $T_s$, $T=P \times T_s$ with P an integer greater than or equal to 1;

ii/ considering the NP successive samples $s_n$, for n=0 to NP−1, of a slice, of duration NT, of the first preamble portion of a received signal packet, determining the sequence of values, $$x_n = c^*_{\lfloor \frac{n}{P} \rfloor} s_n;$$

iii/ considering the NP successive samples $z_n$, for n=0 to NP−1, of a slice, of duration NT, of the second preamble portion of a received signal packet, determining the sequence of values $$y_n = c_{\lfloor \frac{n}{P} \rfloor} z_n;$$

iv/ determining the frequency $f_d$ of the sequence $x_n$ and the frequency $f_g$ of the sequence $y_n$ with n=0 to NP−1;

v/ computing at least one shift to be applied to synchronize to the received signal among a frequency shift $\Delta f$ and a time shift $t_{0m}$ according to the following equations:

$$f_d = \frac{1}{NPT_s}\left(\left\lfloor \frac{t_{0m}}{T} \right\rfloor + \epsilon\right) + \Delta f$$

$$f_g = -\frac{1}{NPT_s}\left(\left\lfloor \frac{t_{0m}}{T} \right\rfloor + \epsilon\right) + \Delta f$$

vi/ a step of synchronizing depending on at least said computed shift.

Such a method makes it possible to achieve a synchronization that is low-SNR (and that therefore uses long sequences, and that gives rise to the accumulation of a high number of pulses) even in the presence of frequency offset.

In some embodiments, such a method will furthermore comprise at least one of the following features:

the receiver device implements the following steps:

performing, for n=0 to NP−1, a discrete Fourier transform, denoted DFT, of the $x_n$ determined for an indexed slice $k_d$, then determining $$n_d = \underset{n_0}{\arg\max}\left(\max_m \left|X_m^{k_d,n_0}\right|\right), \text{ where } X_m^{k_d,n_0} = DFT\left(x_{nP+n_0}^{k_d}\right), n_0 \in [\![0; P-1]\!]$$

and then determining the index $m_d \in [\![0; N-1]\!]$ of the maximum of the modulus of $$X_m^{k_d,n_d},$$

i.e.

$$m_d = \underset{m}{\arg\max}\left|X_m^{k_d,n_d}\right|;$$

determining an estimate, $\hat{f}_d$, of the value of the frequency $f_d$ with $$\hat{f}_d = \begin{cases} \dfrac{m_d}{NT} & \text{if } m_d < \dfrac{N}{2} \\[2ex] \dfrac{m_d}{NT} - \dfrac{1}{T_s} & \text{if } m_d \geq \dfrac{N}{2} \end{cases};$$

performing, for n=0 to NP−1, a discrete Fourier transform, denoted DFT, of the $$y_{nP+n_d}^{k_g}$$

determined for an indexed slice $k_g$, then being given $$Y_m^{k_g,n_d} = y_{nP+n_d}^{k_g}$$

$n_0 \in [\![0; P-1]\!]$ and then determining the index $m_g \in [\![0; N-1]\!]$ of the maximum of the modulus of $$Y_m^{k_g,n_d}$$

i.e.

$$m_g = \underset{m}{\arg\max}\left|Y_m^{k_g,n_d}\right|;$$

determining an estimate, $\hat{f}_g$, of the value of the frequency $f_g$ with $$\hat{f}_g = \begin{cases} \dfrac{m_g}{NT} & \text{if } m_g < \dfrac{N}{2} \\[2ex] \dfrac{m_g}{NT} - \dfrac{1}{T_s} & \text{if } m_g \geq \dfrac{N}{2} \end{cases};$$

the receiver device determines an estimate $\widehat{\Delta f}$ of the frequency shift $\Delta f$ using the following formula:

$$\widehat{\Delta f} = \frac{\hat{f}_d + \hat{f}_g}{2};$$

if $m_d$ and $m_g$ do not have the same parity, the value of that of $m_d$ and $m_g$ whose second largest Fourier-transform value is closest to the maximum is then modified, the value of the modified index being set equal to the index of this second value;

the receiver device implements the following steps: computing $$\Delta\varphi_0 = \arg\left(X_{m_d}^{k_d+1,n_d} conj\left(X_{m_d}^{k_d,n_d}\right)\right)$$

letting $m_{d2}$ be the index neighbouring $m_d$ such that $$\left|X_{m_d}^{k_d,n_d}\right|$$

and $$\left|X_{m_{d2}}^{k_d,n_d}\right|$$

are spaced apart by less than a predefined value, the value of $\Delta\varphi$ is determined by applying:

if $\Delta\varphi_0 < 0$ and $m_d - m_{d2} < 0$ then $\Delta\varphi = \Delta\varphi_0 + 2\pi$
if $\Delta\varphi_0 > 0$ and $m_d - m_{d2} > 0$ then $\Delta\varphi = \Delta\varphi_0 - 2\pi$
otherwise $\Delta\varphi = \Delta\varphi_0$
determining an estimate $\widehat{\Delta f}$ of the frequency shift $\Delta f$ using the following formula $$\widehat{\Delta f} = \frac{\hat{f}_d + \hat{f}_g}{2} + \frac{\Delta\varphi}{2\pi NT}.$$

According to another aspect, the invention describes a computer program intended to be stored in the memory of a telecommunications receiver device further comprising a microcomputer, said computer program comprising instructions that, when they are executed on the microcomputer, implement steps i, ii, iii and iv of a method according to the first aspect of the invention.

The invention also describes a non-transient computer-readable medium storing such a computer program.

According to another aspect, the invention describes a telecommunications receiver device configured to receive an impulse radio ultrawide-band signal comprising data packets, a data packet comprising a preamble, said receiver device being configured to perform an operation of synchronizing to the received signal depending on said preamble;

said device being characterized in that, the preamble comprising a first preamble portion of at least two occurrences of a first preamble sequence of N pulses spaced apart by a period T and that are each equal to a reference pulse weighted by a complex coefficient $c_n$, n=0 to N−1 indicating the rank of the pulse in the first sequence, said preamble further comprising a second preamble portion of at least two occurrences of a second preamble sequence equal to the complex conjugate of the first sequence, the device being configured to sample the preamble with a sampling period $T_s$, $T=P{\times}T_s$ with P an integer greater than or equal to 1;

the device further being configured to, considering the NP successive samples $s_n$, for n=0 to NP−1, of a slice, of duration NT, of the first preamble portion of a received signal packet, determine the sequence of values, $$x_n = c^*_{\lfloor \frac{n}{P} \rfloor} s_n;$$

the device further being configured to, considering the NP successive samples $z_n$, for n=0 to NP−1, of a slice, of duration NT, of the second preamble portion of a received signal packet, determine the sequence of values $$y_n = c_{\lfloor \frac{n}{P} \rfloor} z_n;$$

the device further being configured to determine the frequency $f_d$ of the sequence $x_n$ and the frequency $f_g$ of the sequence $y_n$ with n=0 to NP−1;

the device further being configured to compute at least one shift to be applied to synchronize to the received signal among a frequency shift $\Delta f$ and a time shift $t_{0m}$ according to the following equations:

$$f_d = \frac{1}{NPT_s}\left(\left\lfloor \frac{t_{0m}}{T} \right\rfloor + \epsilon\right) + \Delta f$$

$$f_g = -\frac{1}{NPT_s}\left(\left\lfloor \frac{t_{0m}}{T} \right\rfloor + \epsilon\right) + \Delta f$$

the device further being configured to perform a synchronization depending at least on said computed shift.

In some embodiments, such a device will furthermore comprise at least one of the following features:

said device is configured to perform, for n=0 to NP−1, a discrete Fourier transform, denoted DFT, of the $x_n$ determined for an indexed slice $k_d$, then determining $$n_d = \arg\max_{n_0}\left(\max_m\left|X_m^{k_d,n_0}\right|\right), \text{ where } X_m^{k_d,n_0} = DFT\left(x_{nP+n_0}^{k_d}\right), n_0 \in [0; P-1]$$

and then determining the index $m_d{\in} [\![0; N{-}1]\!]$ of the maximum of the modulus of $$X_m^{k_d,n_d}$$

i.e.

$$m_d = \arg\max_m\left|X_m^{k_d,n_d}\right|;$$

said device being configured to determine an estimate, $\hat{f}_d$, of the value of the frequency $f_d$ with $$\hat{f}_d = \begin{cases} \dfrac{m_d}{NT} & \text{if } m_d < \dfrac{N}{2} \\ \dfrac{m_d}{NT} - \dfrac{1}{T_s} & \text{if } m_d \geq \dfrac{N}{2} \end{cases};$$

said device being configured to perform, for n=0 to NP−1, a discrete Fourier transform, denoted DFT, of the $$y_{nP+n_d}^{k_g}$$

determined for an indexed slice $k_g$, then being given $$Y_m^{k_g,n_d} = DFT\left(y_{nP+n_d}^{k_g}\right),$$

$n_0{\in} [\![0; P{-}1]\!]$ and then determining the index $m_g{\in} [\![0; N{-}1]\!]$ of the maximum of the modulus of $$Y_m^{k_g,n_d},$$

i.e.

$$m_g = \arg\max_m\left|Y_m^{k_d,n_d}\right|;$$

said device being configured to determine an estimate, $\hat{f}_g$, of the value of the frequency $f_g$ with $$\hat{f}_g = \begin{cases} \dfrac{m_g}{NT} & \text{if } m_g < \dfrac{N}{2} \\ \dfrac{m_g}{NT} - \dfrac{1}{T_s} & \text{if } m_g \geq \dfrac{N}{2} \end{cases};$$

said device is configured to determine an estimate $\hat{\Delta}f$ of the frequency shift $\Delta f$ using the following formula:

$$\hat{\Delta}f = \frac{\hat{f}_d + \hat{f}_g}{2};$$

said device is configured to, if $m_d$ and $m_g$ do not have the same parity, modify the value of that of $m_d$ and $m_g$ whose second largest Fourier-transform value is closest to the maximum, the value of the modified index being set equal to the index of this second value.

BRIEF DESCRIPTION OF THE DRAWINGS

The invention will be better understood and other features, details and advantages will become more clearly apparent on reading the non-limiting description that follows, and by virtue of the appended figures, which are given by way of example.

Figure 7:
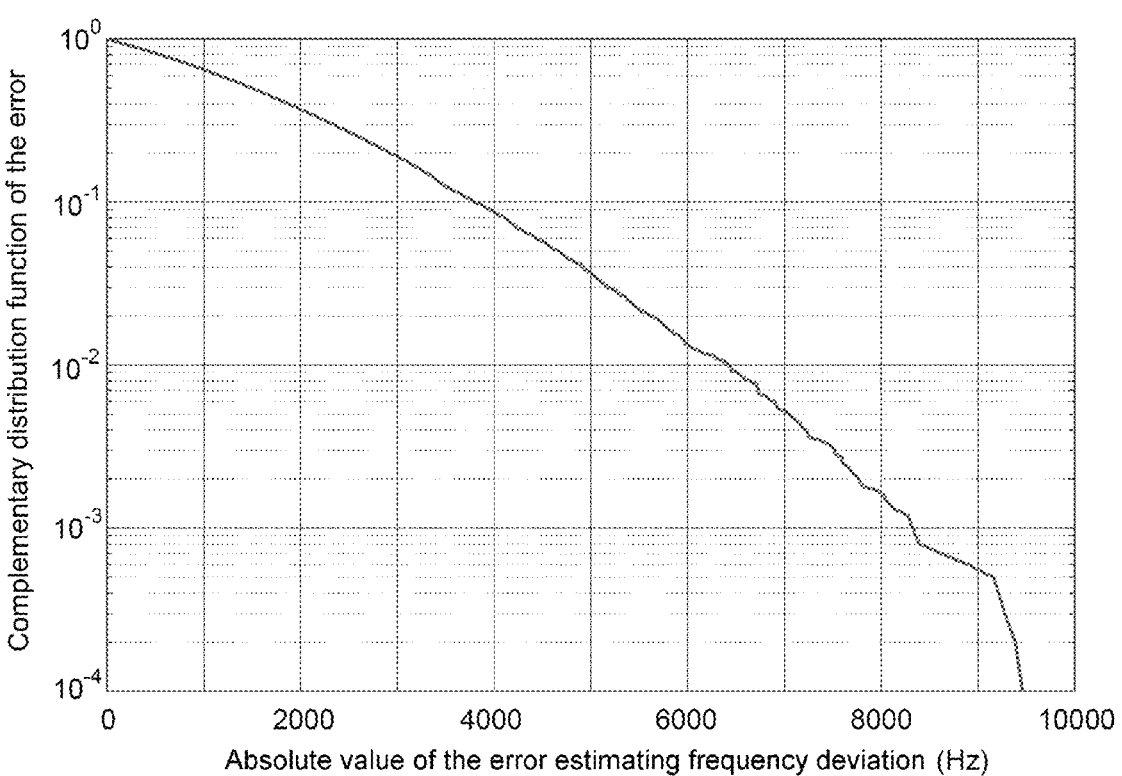
Figure 8:
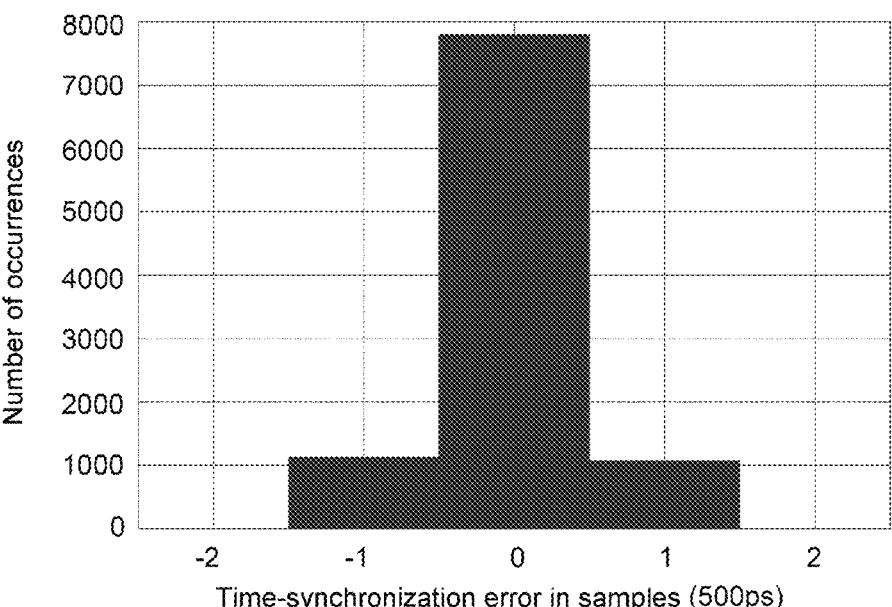

in one embodiment of the invention;

FIG. 7 shows the empirical complementary distribution function of the error in estimation of the frequency deviation in one embodiment of the invention;

FIG. 8 shows the time-synchronization error in one embodiment of the invention.

Identical references may be used in various figures to designate identical or comparable elements.

DETAILED DESCRIPTION

Figure 2:
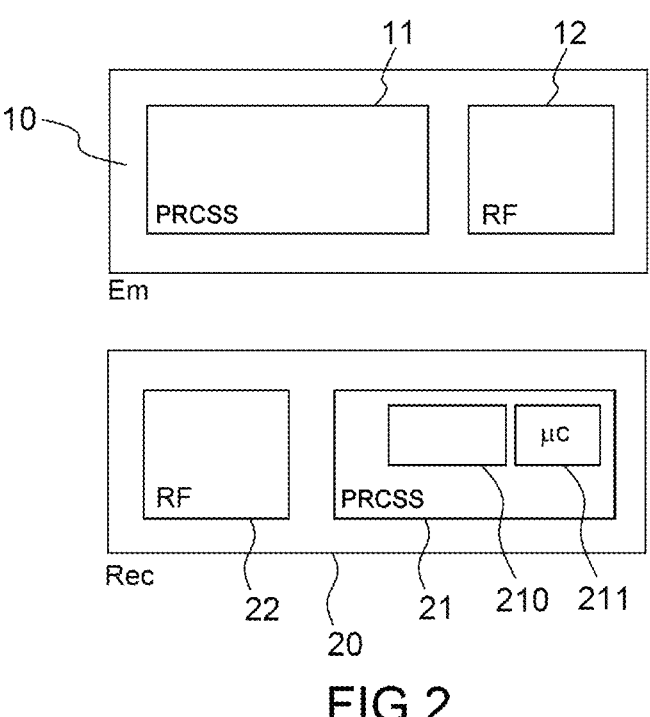
FIG. 2 schematically shows a transmitter device and a receiver device in one embodiment of the invention.

FIG. 2 shows a transmitter device 10 and a receiver device 20 that are configured to implement IR-UWB telecommunications in one embodiment of the invention.

The transmitter device 10, called the transmitter 10 below, comprises an electronic processing module 11 and an RF module 12 (RF standing for radio-frequency). The electronic processing module 11 comprises a memory and a microcontroller (which have not been shown). Typically, the processing module 11 of the transmitter is configured to perform the following processing operations in particular: applying error-correcting codes, interleaving data, converting sequences of bits into symbols, data framing, and applying pulse-shaping filters. The RF module 12 of the transmitter 10 is configured to perform the following processing operations: transposing the signal from the baseband to the carrier frequency, amplifying and filtering the signal and transmitting an IR-UWB radio signal via an RF antenna. The memory stores instructions that, when executed on the microcontroller, implement those (or certain) of the steps that are the responsibility of the processing module 11 of the transmitter 10, which steps are described below.

Similarly, the receiver device 20, called the receiver 20 below, comprises an electronic processing module 21 and a radio-frequency module 22. The electronic processing module 21 comprises a memory 210 and a microcontroller 211. Typically, the RF module 22 of the receiver 20 is configured to perform the processing operations of transposing the received signal to baseband, and of filtering and amplifying the received signal. The processing module 21 of the receiver 20 is in particular configured to perform the following processing operations such as sampling with the period $T_s$: filtering, slicing, multiplying the slices by a predefined sequence, frequency estimation, correcting the carrier frequency offset and time shift, converting the received symbols into an input metric for error correction decoding (typically log likelihood ratios or LLRs), de-interleaving, and decoding. The memory 210 stores instructions that, when executed on the microcontroller 211, in particular implement those (or certain) of the steps that are the responsibility of the processing module 21 of the receiver 20, which steps are described below.

The IR-UWB telecommunications implemented between the transmitter 10 and the receiver 20 for example conform to the generally accepted definition, namely: a UWB signal (a signal with either a bandwidth/carrier frequency ratio greater than 20% or a bandwidth greater than 500 MHz) made up of pulses of short duration (these pulses have a duration that corresponds to the bandwidth of the signal: of about 2 ns for 500 MHz, 1 ns for 1 GHz etc.).

Figure 3:
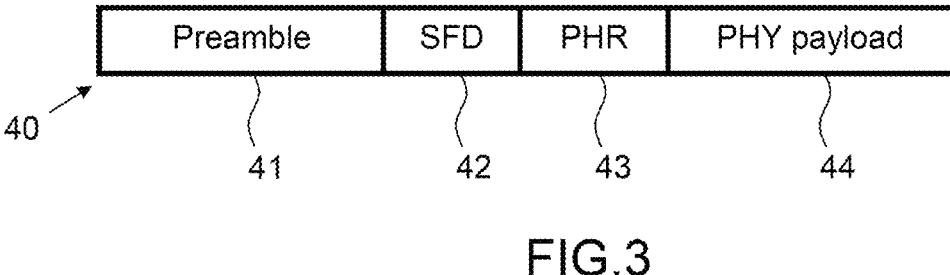
FIG. 3 shows the structure of a data packet in one embodiment of the invention.

FIG. 3 shows the general structure, in the physical layer, of a data packet 40 transmitted in an IR-UWB signal transmitted by the transmitter 10 and received by the receiver 20 in one embodiment of the invention.

The packet 40, the format of which for example conforms to the standard IEEE802.15.4 mentioned above, begins with a preamble (Preamble 41) that is used by the receiver 20 to detect the packet, and to achieve time synchronization and frequency synchronization. The field SFD 42 (SFD standing for start-of-frame delimiter) allows the end of the preamble to be determined. The field PHR 43 (PHR standing for PHY header) contains data on the packet such as the size of the data present in the field PHY payload 44. The field PHY payload 44 contains the payload from the point of view of the physical layer.

The preamble according to the invention comprises a first preamble portion comprising (and in the present case, formed from) a repetition of one symbol and a second preamble portion comprising (and in the present case, formed from) a repetition of another symbol. Each of these symbols comprises (and here is formed from) a respective sequence of pulses, each pulse in the sequence being equal to a reference pulse weighted by a complex coefficient.

The general principles of a synchronizing method according to the invention will now be explained.

For the (n+1)th pulse in the symbol in question in the first preamble portion, the complex weighting coefficient has the value $$c_n = \exp\left(-\frac{i\pi n^2}{N}\right), \text{ for } n \in [0, N-1]$$

with N the size of the sequence of pulses of which the symbol consists.

Figure 4:
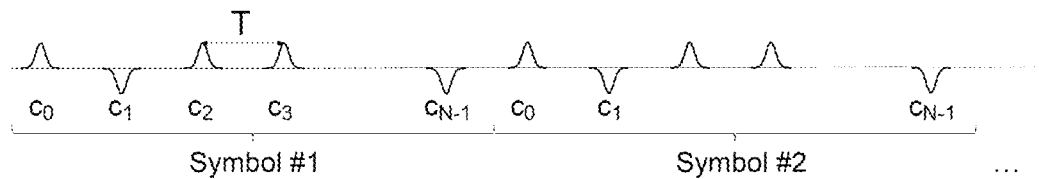
FIG. 4 schematically shows the pulses of a preamble of a packet in one embodiment of the invention.

FIG. 4 shows pulses of the first preamble portion, each weighted by their associated complex coefficient $c_n$, in one embodiment given by way of illustration (in the schematic, the coefficients are only +/−1 to simplify the drawing).

Let p(t) be the waveform used for the reference pulse, and T be the distance between two consecutive pulses, which is called pulse repetition period (PRP). A symbol of the first preamble portion is then written:

$$u(t) = \sum_{n=0}^{N-1} c_n p(t - nT)$$

The first portion v(t) of the preamble 41 transmitted by the transmitter 10 contains M repetitions of this symbol, with M greater than or equal to 2:

$$v(t) = \sum_{n=0}^{M-1} u(t - kNT) = \sum_{k=0}^{M-1}\sum_{n=0}^{N-1} c_n p(t - (kN + n)T)$$

The signal received by the receiver 20 has been subjected to the propagation channel h(t) and to the receiver noise n(t), and hence the received first preamble portion is:

$$r(t) = h * u(t) + n(t) = \sum_{k=0}^{M-1} \sum_{n=0}^{N-1} c_n p_h(t - (kN + n)T) + n(t)$$

where $p_h(t)$ is the convolution of the waveform with the channel: $p_h(t) = h * p(t)$ In addition, since the receiver 20 is not perfectly aligned in frequency with the transmitter 10, a frequency offset term $\Delta f$ is taken into account, as is a phase term $\phi$ and a time origin $t_0$:

$$s(t) = r(t - t_0) \exp(2i\pi\Delta ft + i\phi)$$

Lastly, the signal is sampled by the receiver 20, with a period $T_s$:

$$s_n = s(nT_s)$$

It is assumed that $T_s$ is a sub-multiple of T: $T = P \times T_s$ (P is the number of samples per PRP)

The signal is further divided into slices of duration NT (the duration of one symbol), by the receiver 20:

$$w_n^k = s_{n+kNP}$$

where k is the number of the slice and n the index within the slice ($n \in [\![0; NP-1]\!]$).

Let d be the vector of size $N \times P$ the components $d_n$ of which are the $c_n$ repeated P times:

$$d = [c_0, c_0, \dots, c_0, c_1, \dots, c_1, \dots, c_{N-1}, \dots, c_{N-1}]^T$$

The product of multiplication of each slice $w^k$ by the complex conjugate of d is:

$$x^k = w^k \cdot d^* =$$
$$[c_0^* s_{kNP}, c_0^* s_{1+kNP}, \dots, c_{N-1}^* s_{NP-1+kNP}]^T$$

Or indeed, expressed more simply, the $n+1^{th}$ component of this vector is written:

$$x_n^k = c_{\lfloor \frac{n}{P} \rfloor}^* s_{n+kNP}$$

Substituting the preceding expressions:

$$x_n^k = c_{\lfloor \frac{n}{P} \rfloor}^* \left( \left( \sum_{l=0}^{M-1} \sum_{m=0}^{N-1} c_m p_h((n + kNP)T_s - t_0 - (lN + m)T) + n((n + kNP)T_s) \right) \right.$$
$$\exp(2i\pi\Delta f(n + kNP)T_s + i\phi) =$$

-continued $$c_{\lfloor \frac{n}{P} \rfloor}^* \left( \sum_{l=0}^{M-1} \sum_{m=0}^{N-1} c_m p_h(nT_s + (k - l)NT - t_0 - mT) + n((n + kNP)T_s) \right)$$

$$\exp(2i\pi\Delta f(n + kNP)T_s + i\phi)$$

If it is assumed that the support of $p_h(t)$ is shorter than the PRP (otherwise the residual interference may be equated to noise and integrated into n(t)), i.e. its support lies in [0; T[, a single term (at most) of the double sum is non-zero, and it is a question of the one that verifies:

$$0 \le nT_s + (k - l)NT - t_0 - mT < T$$

This amounts to:

$$m = \left\lfloor \left( \frac{n}{P} + (k - l)N \right) - \frac{t_0}{T} \right\rfloor$$

with l such that $$\left\lfloor \left( \frac{n}{P} + (k - l)N \right) - \frac{t_0}{T} \right\rfloor \in [0; N-1]$$

(if the solution for l is not in [0, M−1], we are not in the preamble).

Therefore:

$$x_n^k =$$

$$c_{\lfloor \frac{n}{P} \rfloor}^* \times \left( c_{\lfloor (\frac{n}{P} + (k-l)N) - \frac{t_0}{T} \rfloor} p_h(nT_s + (k - l)NT - t_0 - mT) + n((n + kNP)T_s) \right) \times$$

$$\exp(2i\pi\Delta f(n + kNP)T_s + i\phi)$$

Generally, the succession $$c_n^* c_{n-\Delta}$$

has a phase increment of $$\frac{2\pi\Delta}{N},$$

even considering a modulo N for the edge effects if N is even (i.e. when n−Δ<0 or n−Δ>N−1), this corresponding to a frequency of $$\frac{\Delta}{NT_s}.$$

Applying this to the present case, and down-sampling by a factor P, $$\Delta = \left\lfloor \frac{n}{P} \right\rfloor - \left\lfloor \frac{n}{P} - \frac{t_{0m}}{T} \right\rfloor \text{(with } t_{0m} = t_0[NT]).$$

Then:

$$\Delta = \left\lfloor \frac{t_{0m}}{T} \right\rfloor + \epsilon$$

where:

$$\epsilon = \begin{cases} 0 & \text{if } \frac{n}{P} - \left\lfloor \frac{n}{P} \right\rfloor \geq \frac{t_{0m}}{T} - \left\lfloor \frac{t_{0m}}{T} \right\rfloor \\ 1 & \text{otherwise} \end{cases}$$

Taking into account the frequency offset, the frequency $f_d$ of the sequence $$x_n^k$$

(for a set k value, and n varying from 0 to NP−1) is:

$$f_d = \frac{1}{NPT_s}\left( \left\lfloor \frac{t_{0m}}{T} \right\rfloor + \epsilon \right) + \Delta f$$

Estimating $f_d$ allows to obtain a relationship between $t_0$ and $\Delta f$.

According to the invention, the second preamble portion transmitted after the first preamble portion comprises a repeated symbol equal to the complex conjugate, u*(t), of the symbol u(t) and, considering this conjugated symbol instead of the preceding one, the $$y_n^k$$

are obtained in a similar way to described with reference to the first preamble portion, but multiplying by d instead of d*:

$$y_n^k =$$

$$c_{\left\lfloor \frac{n}{P} \right\rfloor} \times \left( c^*_{\left\lceil \frac{n}{P} + (k-l)N \right\rceil - \frac{L_0}{T}} \left| p_h(nT_s + (k-l)NT - t_0 - mT) + n((n + kNP)T_s) \right| \right) \times$$

$$\exp(2i\pi\Delta f(n + kNP)T_s + i\phi)$$

Depending on the $$y_n^k,$$

the equivalent of $f_d$, which is denoted $f_g$, is obtained, i.e. the frequency of the $$y_n^k:$$

$$f_g = -\frac{1}{NPT_s}\left( \left\lfloor \frac{t_{0m}}{T} \right\rfloor + \epsilon \right) + \Delta f$$

Knowledge of $f_d$ and $f_g$ makes it possible to determine the value of $t_0$ and/or the value of $\Delta f$ (more exactly $t_{0m}$: for the time synchronization to the preamble, i.e. what is being sought), with a view to achieving time synchronization (depending on $t_{0m}$) and/or frequency synchronization (depending on $\Delta f$).

To avoid ambiguities in the estimation of $\Delta f$, it is necessary to have a phase rotation between two pulses less than $\pi$ in absolute value, this corresponding to $$|\Delta f| < \frac{1}{2T}.$$

Figure 1:
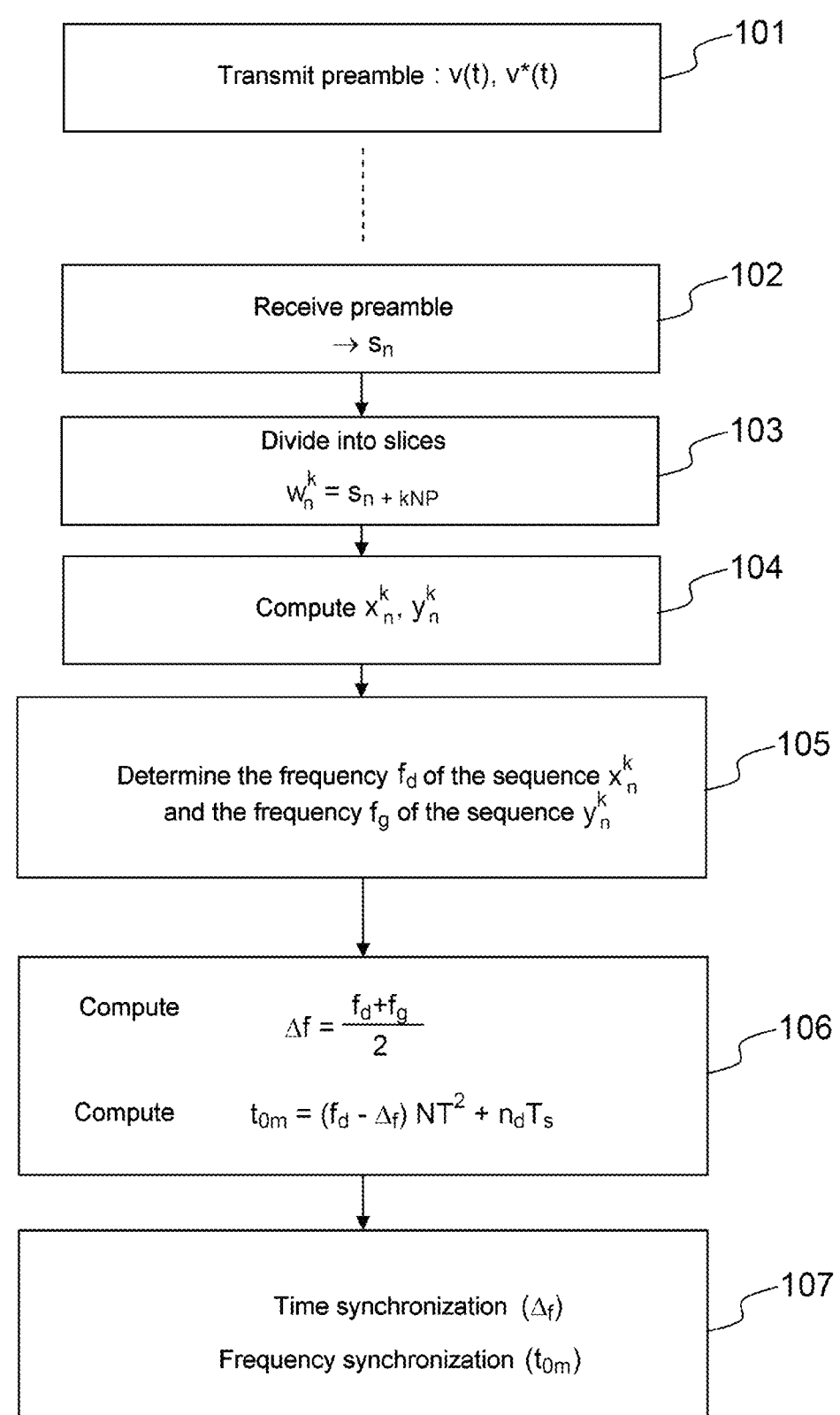
FIG. 1 shows steps of a synchronizing method in one embodiment of the invention.

FIG. 1 shows the steps of a synchronizing method in one embodiment of the invention, exploiting the general principles explained above.

In a step 101, the transmitter 10 constructs and transmits an IR-UWB signal in which the data packets each comprise a preamble, comprising a first preamble portion v(t) repeating M times (with M greater than or equal to 2) the symbol u(t), and comprising, after the first preamble portion, a second preamble portion repeating M' times (with M' greater than or equal to 2) the symbol u*(t). When M is equal to M', the second preamble portion is equal to v*(t).

In a step 102, the RF module 22 of the receiver 20 receives the packets resulting from this transmission and transposes them to baseband. Using the same names as those used in the description of the general principles of the invention above, the processing module 21 after sampling ($T_s$) obtains the values $s_n$ depending on the first preamble portion of a packet in question.

In a step 103, these successive values of $s_n$ are divided into slices by the processing module 21, which then determines, for at least one slice of size NP, the values $$w_n^k = s_{n+kNP}$$

where k is the number of the slice in question and n the index within the slice (n $\in$ [[0; NP−1]]).

In a step 104, the processing module 21 computes $x^k = w^k \cdot d^*$ and thus determines the $$x_n^k,$$

for at least one slice (the slice indexed k) and for n=0 to NP−1.

The processing operations indicated above in steps 102-104 relative to the first preamble portion are also carried out relative to the second preamble portion: the processing module 21 thus determines the $$y_n^{k'},$$

for at least one slice (indexed k') and for n=0 to NP−1 (k' may or may not be equal to k).

In a step 105, the processing module 21 determines the frequency $f_d$ of the sequence $$x_n^k$$

The frequency $f_d$ is, depending on the embodiment, determined based on a single slice of the $$x_n^k$$

or indeed on a plurality of slices (for example by averaging the various frequency values obtained in various slices), this improving the accuracy of the determined estimate. The same goes for the frequency $f_g$ relative to the $$y_n^k.$$

There are various ways of determining these frequencies: using the discrete Fourier transform described below or computing the variation in average phase between two PRPs (by finding the argument of the average of the conjugate complex products of samples spaced apart by one PRP) and division by $2\pi T$ etc.

In a step 106, the processing module 21 then computes at least one of the parameters $\Delta f$ and $t_{0m}$, based on the values of the frequencies $f_d$ and $f_g$ obtained in step 105 and on the following system of equations:

$$f_d = \frac{1}{NPT_s}\left(\left\lfloor \frac{t_{0m}}{T} \right\rfloor + \epsilon \right) + \Delta f$$

$$f_g = -\frac{1}{NPT_s}\left(\left\lfloor \frac{t_{0m}}{T} \right\rfloor + \epsilon \right) + \Delta f$$

$\epsilon$ being such as defined above (in the case described below, it is the estimate of n that will give $\epsilon$, the n coming from the FFT having the strongest signal. In practice, the n that is of interest is in the pulse. The support of p(t) starts before the pulse, the $t_0$ is with respect to the start of the support and therefore necessarily the fractional part of $t_0/T$ will be smaller than that of n/P and therefore it will always be the case that $\epsilon = 0$).

Next, the processing module 21 performs at least one step 107 of synchronization with respect to the packet in question, among a frequency synchronization depending on the value obtained for $\Delta f$ and a time synchronization depending on the value obtained for $t_{0m}$.

The frequency synchronization can be achieved by applying a correction to the phase of the received samples $s_n$, for example by multiplying them by exp $$\left(\frac{2i\pi\Delta f_{est}n}{T_s}\right);$$

and the time synchronization by shifting the received samples with respect to time.

Subsequent processing is then carried out in one embodiment, once synchronization to the received packet has been achieved, based on this processing on its preamble: decoding the data in the field Payload 44, measuring time of arrival (for location purposes) depending on predefined symbols present in the packet, etc.

The present invention makes it possible to achieve a synchronization that is low-SNR (and that therefore uses long sequences, and that gives rise to the accumulation of a high number of pulses) in the presence of conventional levels of central frequency offset (CFO), typically about 20 or 40 ppm.

Figure 5:
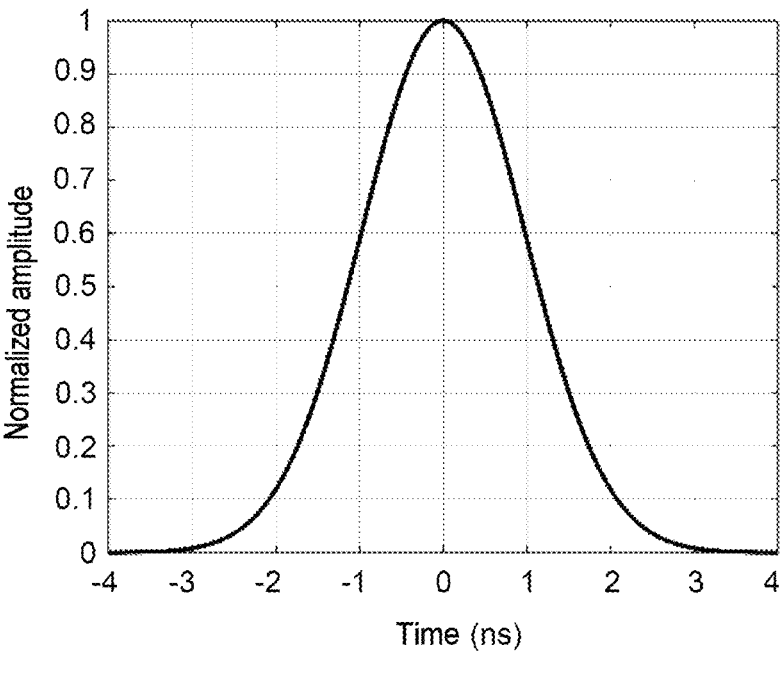
FIG. 5 shows a Gaussian pulse of 500 MHz used in one embodiment of the invention.

By way of example in the context of a digital application, N=1024, T=8 ns, $T_s$=500 ps and the Gaussian pulse has a −10 dB bandwidth of 500 MHz, as shown in FIG. 5:

$$p(t) = A \, \exp\left(-\left(\frac{t}{\tau}\right)^2\right)$$

where A is the amplitude and $\tau$=1.37 ns (to obtain a band of 500 MHz).

In one embodiment, the processing module 21 estimates the values of $f_d$ and $f_g$ using a discrete Fourier transform (it is possible to include a step of detecting the presence of the preamble by comparing the obtained Fourier-transform values with a threshold as explained below). For given k, the sequence $$x_n^k$$

has a length NP, and therefore the sub-sampled sequences $$x_{nP+n_0}^k$$

have a length N ($n_0 \in [\![ 0; P-1 ]\!]$).

Let DFT be the Fourier-transform function:

$$X_m^{k_d, n_0} = DFT\left(x_{nP+n_0}^{k_d}\right) m \in [\![ 0; N-1 ]\!]$$

(discrete Fourier transform of a sequence of length N) where $k_d$ corresponds to one slice.

Let $n_d$ be the value of $n_0$ such that the maximum of $$X_m^{k_d, n_0}$$

is the maximum over the $n_0$ of the maxima over the m:

$$n_d = \arg\max_{n_0}\left(\max_m \left| X_m^{k_d, n_0} \right|\right)$$

This amounts to choosing the shift of the sub-sampling that samples the pulses at their maximum.

Figure 6:
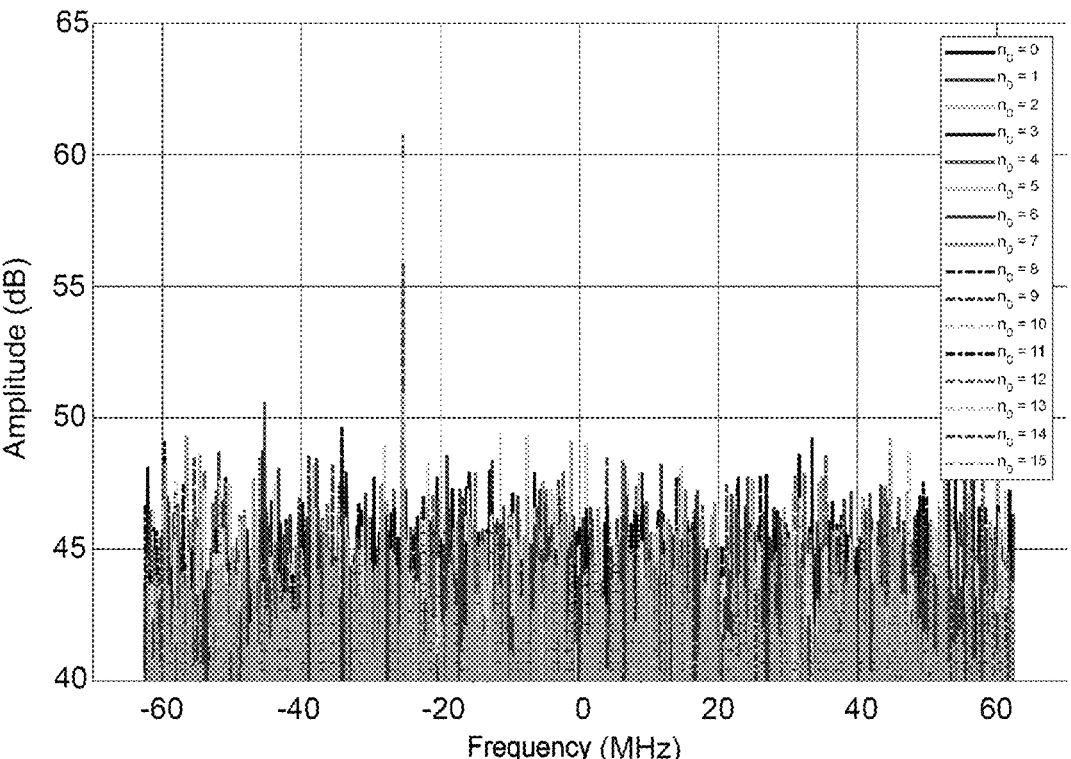
FIG. 6 shows the Fourier transforms of the sequences $$x_{nP+n_0}^{k_d}$$

FIG. 6 shows, with frequency on the x-axis and the amplitude on the y-axis, the Fourier transforms of the sequences $$x_{nP+n_0}^{k_d}$$

(here $n_d$=12 and $\hat{f}_d$=−25.4 MHz).

Let $m_d \in [\![0; N-1]\!]$ be the index of the maximum of the modulus of $$X_m^{k_d,n_d}:$$

$$m_d = \arg\max_m \left| X_m^{k_d,n_d} \right|$$

$$m \in [\![0; N-1]\!].$$

In one embodiment, the value of the maximum may be used to detect the preamble, as mentioned above, by comparing it with a threshold.

The processing module 21 determines an estimate of $f_d$:

$$\hat{f}_d = \begin{cases} \dfrac{m_d}{NT} & \text{if } m_d < \dfrac{N}{2} \\ \dfrac{m_d}{NT} - \dfrac{1}{T_s} & \text{if } m_d \geq \dfrac{N}{2} \end{cases}$$

The processing module 21 does the same on the second preamble portion (corresponding to the conjugated symbol). The estimate of $n_d$ is still valid, and therefore the following is computed directly:

$$Y_m^{k_g,n_d} = DFT\left( x_{nP+n_d}^{k_g} \right)$$

where $k_g$ corresponds to a slice in which the conjugated sequence is present. Whether or not the conjugated sequence is present may be determined by comparing the value of the maximum of the modulus of the Fourier transform with a threshold.

Let $m_g \in [\![0; N-1]\!]$ be the index of the maximum of the modulus of $$Y_m^{k_g,n_d}:$$

$$m_g = \arg\max_m \left| Y_m^{k_g,n_d} \right|$$

The processing module 21 then determines an estimate of $f_g$:

$$\hat{f}_g = \begin{cases} \dfrac{m_g}{NT} & \text{if } m_g < \dfrac{N}{2} \\ \dfrac{m_g}{NT} - \dfrac{1}{T_s} & \text{if } m_g \geq \dfrac{N}{2} \end{cases}$$

From these estimates, the estimate of the frequency offset is deduced:

$$\widehat{\Delta f} = \frac{\hat{f}_d + \hat{f}_g}{2}$$

The estimates of $f_d$ and $f_g$ are made modulo 1/T (Fourier transform of a signal sampled with the period $PT_s$=T), and therefore the estimate of $\widehat{\Delta f}$ is modulo 1/2T; therefore, to avoid any ambiguity it is necessary for $|\Delta f| < 1/4T$.

In the above example, P DFTs are performed (one for each $n_0$ from 0 to P−1). In other embodiments, only any number of DFTs greater than or equal to 1 and strictly less than P is performed and taken into account for the estimates, while bearing in mind that the closer this number is to P the better the accuracy of the estimate.

With T=8 ns, $|\Delta f| < 31$ MHz are obtained. For a central frequency of about 10 GHz (case of the highest channel of "IEEE Standard for Low-Rate Wireless Networks," in *IEEE Std* 802.15.4-2020 (*Revision of IEEE Std* 802.15.4-2015), vol., no., pp. 1-800, Jul. 23, 2020), the relative offset is 3100 ppm (the oscillators conventionally used are better than a few tens of ppm). The tolerated frequency offset depends only on T and not on N. This makes it possible to use long sequences to tolerate low SNR. Conversely, if it is desired to be able to tolerate 40 ppm, this permits distances between pulses ranging up to 625 ns.

To improve accuracy, a plurality of techniques may be used complementarily in embodiments:

First of all, the indices $m_d$ and $m_g$ must theoretically be of same parity. Specifically, if $t_{0m}$ is zero, the $f_d$ and $f_g$ would be equal. When $t_{0m}$ increases by T, then $m_d$ increases by 1 and $m_g$ decreases by 1 and therefore they keep the same parity.

Hence, if $m_d$ and $m_g$ do not have the same parity, the value of the one thereof whose second largest Fourier-transform value (i.e. the second largest value among the $$\left| X_m^{k_d,n_0} \right|$$

for $m_d$ and the second largest value among the $$\left| Y_m^{k_g,n_0} \right|$$

for $m_g$) is closest to the maximum is then modified. The value of the retained index (i.e. the value of the one retained among $m_d$ and $m_g$) will be the value of the index of this second value. For example, if $m_d$=2 and $m_g$=7, the following are computed $$\begin{cases} D_{dg} = \left| X_2^{k_d,n_0} \right| - \left| X_1^{k_d,n_0} \right| \\ D_{dd} = \left| X_2^{k_d,n_0} \right| - \left| X_3^{k_d,n_0} \right| \\ D_{gg} = \left| Y_7^{k_g,n_0} \right| - \left| Y_6^{k_g,n_0} \right| \\ D_{gd} = \left| Y_7^{k_g,n_0} \right| - \left| Y_8^{k_g,n_0} \right| \end{cases}.$$

If, for example, $D_{dd}$ is the smallest of the four differences, $m_d$ will be corrected to give it the value 3 instead of 2, $m_g$ will remain at 7. Likewise, if $D_{gg}$ is the smallest, $m_g$ will be corrected to give it the value of 6 instead of 7 and $m_d$ will remain unchanged. Care must be taken with edge effects: the left-side neighbour of 0 is N−1, and the right-side neighbour of N−1 is 0.

As a consequence, the resolution of the estimator of $f_d$ and $f_g$ (here the increment of the transform) is $1/NT_s$. To improve this and therefore improve the resolution of $\widehat{\Delta f}$ by seeking the fractional part of the index of the maximum of the Fourier transform, the phase rotation between two successive Fourier transforms (it is thus necessary for M to be greater than or equal to 3) is computed for the index $m_d$:

$$\Delta\varphi_0 = \arg\left(X_{m_d}^{k_d+1,n_d} conj\left(X_{m_d}^{k_d,n_d}\right)\right)$$

The sought fractional part is $\Delta\varphi_0/2\pi$

To take this fractional part into account, attention must be paid to the case where the frequency $f_d$ falls in the middle of two Fourier-transform frequencies. This may be detected in two ways: either $|\Delta\varphi_0|$ is close to $\pi$, or $$\left|X_{m_d}^{k_d,n_d}\right|$$

is close to $$\left|X_{m_d+1}^{k_d,n_d}\right|$$

or $$\left|X_{m_d-1}^{k_d,n_d}\right|.$$

The sign of $\Delta\varphi_0$ must be consistent with the index of the second maximum. Otherwise, the processing module 21 adds or subtracts $2\pi$ to or from $\Delta\varphi_0$. Let $m_{d2}$ be the neighbouring index ($m_{d2}$ is equal to either $m_d-1$ or $m_d+1$ paying attention to edge effects (the value is modulo N) of $m_d$) such that $$\left|X_{m_d}^{k_d,n_d}\right|$$

and $$\left|X_{m_{d2}}^{k_d,n_d}\right|$$

are close (i.e. their difference is less than a set threshold, for example less than 0.3 in relative terms), the processing module applies the following rules (while however paying attention to the edge effects: if $m_d$ is equal to N−1 and $m_{d2}$ is equal to 0, the difference is considered to be −1 and not N−1 (0 and N−1 are 1 apart)):

if $\Delta\varphi_0 < 0$ and $m_d - m_{d2} < 0$ then $\Delta\varphi = \Delta\varphi_0 + 2\pi$ if $\Delta\varphi_0 > 0$ and $m_d - m_{d2} > 0$ then $\Delta\varphi = \Delta\varphi_0 + 2\pi$ otherwise $\Delta\varphi = \Delta\varphi_0$ The final frequency-shift estimate made by the processing module is then:

$$\widehat{\Delta f} = \frac{\hat{f}_d + \hat{f}_g}{2} + \frac{\Delta\varphi}{2\pi NT}$$

The performances are illustrated in FIG. 7. These performances were obtained with a simulation of 10000 samples with frequency deviations inducing phase rotations of up to $10\pi$ in a sequence (i.e. 610 kHz), which were uniformly distributed. The SNR is −10 dB in a pulse (channel with Gaussian additive white noise). The other numerical values had the values indicated above. Thus, it may be seen from FIG. 7 that the estimation error is less than 6400 Hz in 99% of cases.

The estimate of the time synchronization is deduced from the frequency estimate:

$$\widehat{\cdot} = (f_d - \widehat{\Delta f})NPT_s - \epsilon$$

It is possible to consider $\epsilon$ to always be zero (cf. above). The fractional part of $t_{0m}/T$ is given by $n_d$. Thus the estimate of $t_{0m}$ is given by:

$$\hat{t}_{0m} = \left(\hat{f}_d - \widehat{\Delta f}\right)NT^2 + n_d T_s$$

The performances obtained with the same simulation as above are given in FIG. 8. The synchronization error is at most 500 ps (1 sample), which is largely acceptable in view of the pulse shape shown in FIG. 5.

The method may be implemented by executing software instructions on a processor. Alternatively, it may be implemented by dedicated hardware, typically a digital integrated circuit, either specific (ASIC) or based on programmable logic (for example FPGA/Field Programmable Gate Array).

The invention claimed is:

1. A method for synchronizing a telecommunications receiver device, the telecommunications receiver device receiving an impulse radio ultrawide-band (IR-UWB) signal, the IR-UWB signal comprising data packets, a data packet of the data packets comprising a preamble, the preamble comprising a first preamble portion of at least two occurrences of a first preamble sequence of N pulses spaced apart by a period T and that are each equal to a reference pulse weighted by a complex coefficient $c_n$, n=0 to N−1 indicating a rank of a pulse in a first sequence, and the preamble further comprising a second preamble portion of at least two occurrences of a second preamble sequence equal to a complex conjugate of the first sequence, the method comprising synchronizing the telecommunications receiver device to the received IR-UWB signal according the preamble, and the method further comprising:

i/ sampling by the telecommunications receiver device, the preamble with a sampling period $T_s$, T=P×$T_s$ with P an integer greater than or equal to 1;

ii/ considering NP successive samples $s_n$, for n=0 to NP−1, of a slice, of duration NT, of the first preamble portion of a received signal packet, and determining, by the telecommunications receiver device, the sequence of values, $$x_n = c^*_{\lfloor \frac{n}{P} \rfloor} s_n,$$

where c* is the complex conjugate;

iii/ considering the NP successive samples $z_n$, for n=0 to NP−1, of a slice, of duration NT, of the second preamble portion of a received signal packet, and determining, by the telecommunications receiver device, the sequence of values $$y_n = c_{\lfloor \frac{n}{P} \rfloor} z_n;$$

iv/ determining, by the telecommunications receiver device, frequency $f_d$ of the sequence $x_n$ and frequency $f_g$ of the sequence $y_n$ with n=0 to NP−1;

v/ computing, by the telecommunications receiver device, at least one shift to be applied to synchronize to the received IR-UWB signal among a frequency shift $\Delta f$ and a time shift $t_{0m}$ according to the following equations:

$$f_d = \frac{1}{NPT_s}\left(\left\lfloor \frac{t_{0m}}{T} \right\rfloor + \epsilon\right) + \Delta f$$

$$f_g = -\frac{1}{NPT_s}\left(\left\lfloor \frac{t_{0m}}{T} \right\rfloor + \epsilon\right) + \Delta f, \text{ and}$$

vi/ synchronizing, by the telecommunications receiver device, the received IR-UWB signal according to the computed shift.

2. The method according to claim 1, the method further comprising:

performing, by the telecommunications receiver device, for n=0 to NP−1, a discrete Fourier transform (DFT) of the $x_n$ determined for an indexed slice $k_d$, then determining $$n_d = \arg\max_{n_0}\left(\max_m \left|X_m^{k_d,n_0}\right|\right),$$

where $X_m^{k_d,n_0} = DFT\left(x_{nP+n_0}^{k_d}\right)$, $n_0 \in [\![0; P-1]\!]$ and then determining index $$m_d \in [\![0; N-1]\!]$$

of the maximum of the modulus of $$X_m^{k_d,n_d},$$

where $$m_d = \arg\max_m \left|X_m^{k_d,n_d}\right|;$$

determining, by the telecommunications receiver device, an estimate, $\hat{f}_d$, of the value of the frequency $f_d$ with $$\hat{f}_d = \begin{cases} \dfrac{m_d}{NT} & \text{if } m_d < \dfrac{N}{2} \\ \dfrac{m_d}{NT} - \dfrac{1}{T_s} & \text{if } m_d \geq \dfrac{N}{2} \end{cases};$$

performing, by the telecommunications receiver device, for n=0 to NP−1, a DFT, of the $$y_{nP+n_d}^{k_g}$$

determined for an indexed slice $k_g$, then being given $$Y_m^{k_g,n_d} = DFT\left(y_{nP+n_d}^{k_g}\right), n_0 \in [\![0; P-1]\!]$$

and determining the index $m_g \in [\![0; N-1]\!]$ of the maximum of the modulus of $$Y_m^{k_g,n_d},$$

i.e.

$$m_g = \arg\max_m \left|Y_m^{k_d,n_d}\right|; \text{ and}$$

determining, by the telecommunications receiver device, an estimate, $\hat{f}_g$, of the value of the frequency $f_g$ with $$\hat{f}_g = \begin{cases} \dfrac{m_g}{NT} & \text{if } m_g < \dfrac{N}{2} \\ \dfrac{m_g}{NT} - \dfrac{1}{T_s} & \text{if } m_g \geq \dfrac{N}{2} \end{cases}.$$

3. The method according to claim 2, wherein the telecommunications receiver device determines an estimate $\widehat{\Delta f}$ of the frequency shift $\Delta f$ utilizing the following formula:

$$\widehat{\Delta f} = \frac{\hat{f}_d + \hat{f}_g}{2}.$$

4. The method according to claim 2, wherein when $m_d$ and $m_g$ do not have the same parity, the value of that of $m_d$ and $m_g$ whose second largest Fourier-transform value is closest to the maximum is then modified, the value of the modified index being set equal to the index of this second value.

5. The method according to claim 2, wherein the telecommunications receiver device implements the following steps:

computing $$\Delta\varphi_0 = \arg\left(X_{m_d}^{k_d+1,n_d} \, conj\left(X_{m_d}^{k_d,n_d}\right)\right);$$

letting $m_{d2}$ be the index neighbouring $m_d$ in a manner that $$\left|X_{m_d}^{k_d,n_d}\right|$$

and $$\left|X_{m_{d2}}^{k_d,n_d}\right|$$

are spaced apart by less than a predefined value, the value of $\Delta\varphi$ is determined by applying:

if $\Delta\varphi_0 < 0$ and $m_d - m_{d2} < 0$ then $\Delta\varphi = \Delta\varphi_0 + 2\pi$, if $\Delta\varphi_0 > 0$ and $m_d - m_{d2} > 0$ then $\Delta\varphi = \Delta\varphi_0 + 2\pi$, otherwise $\Delta\varphi = \Delta\varphi_0$; and determining an estimate $\widehat{\Delta f}$ of the frequency shift $\Delta f$ using the following formula:

$$\widehat{\Delta f} = \frac{\hat{f}_d + \hat{f}_g}{2} + \frac{\Delta\varphi}{2\pi NT}.$$

6. A non-transitory computer readable storage medium having stored thereon a computer program with code stored on said storage medium, the code, when executed by a microcomputer, causes the microcomputer to implement the steps i, ii, iii and iv of the method according to claim 1.

7. A device comprising:

a memory;

a processor; and a telecommunications receiver device coupled to the memory and processor, the telecommunications receiver device configured to:

receive an impulse radio ultrawide-band (IR-UWB) signal, the IR-UWB signal comprising data packets, a data packet of the data packets comprising a preamble, the preamble comprising a first preamble portion of at least two occurrences of a first preamble sequence of N pulses spaced apart by a period T and that are each equal to a reference pulse weighted by a complex coefficient $c_n$, n=0 to N−1 indicating a rank of the pulse in the first sequence, and the preamble further comprising a second preamble portion of at least two occurrences of a second preamble sequence equal to the complex conjugate of the first sequence;

perform an operation of synchronizing to the received IR-UWB signal according to the preamble;

sample the preamble with a sampling period $T_s$, T=P× $T_s$ with P an integer greater than or equal to 1;

consider NP successive samples $s_n$, for n=0 to NP−1, of a slice, of duration NT, of the first preamble portion of a received signal packet, and determine the sequence of values, $$x_n = c_{\left\lfloor\frac{n}{P}\right\rfloor}^* s_n;$$

consider NP successive samples $z_n$, for n=0 to NP−1, of a slice, of duration NT, of the second preamble portion of a received signal packet, determine the sequence of values $$y_n = c_{\left\lfloor\frac{n}{P}\right\rfloor} z_n;$$

determine frequency $f_d$ of the sequence $x_n$ and frequency $f_g$ of the sequence $y_n$ with n=0 to NP−1;

compute at least one shift to be applied to synchronize to the received IR-UWB signal among a frequency shift $\Delta f$ and a time shift $t_{0m}$ according to the following equations:

$$f_d = \frac{1}{NPT_s}\left(\left\lfloor\frac{t_{0m}}{T}\right\rfloor + \epsilon\right) + \Delta f$$

$$f_g = -\frac{1}{NPT_s}\left(\left\lfloor\frac{t_{0m}}{T}\right\rfloor + \epsilon\right) + \Delta f; \text{ and}$$

perform a synchronization depending at least on said computed shift.

8. The device according to claim 7, wherein the telecommunications receiver device is configured to perform, for n=0 to NP−1, a discrete Fourier transform (DFT) of the $x_n$ determined for an indexed slice $k_d$, then to determine $$n_d = \arg\max_{n_0}\left(\max_m\left|X_m^{k_d,n_0}\right|\right),$$

where $$X_m^{k_d,n_0} = DFT\left(x_{nP+n_0}^{k_d}\right),$$

$$n_0 \in [\![0; P-1]\!]$$

and then to determine index $m_d \in [\![0; N-1]\!]$ of the maximum of the modulus of $$X_m^{k_g,n_d},$$

where $$m_d = \arg\max_m\left|X_m^{k_d,n_d}\right|; \text{ and}$$

determine an estimate, $\hat{f}_d$, of the value of the frequency $f_d$ with $$\hat{f}_d = \begin{cases} \dfrac{m_d}{NT} & \text{if } m_d < \dfrac{N}{2} \\[2mm] \dfrac{m_d}{NT} - \dfrac{1}{T_s} & \text{if } m_d \geq \dfrac{N}{2} \end{cases} ;$$

and said telecommunications receiver device being configured to perform, for n=0 to NP−1, a discrete Fourier transform (DFT), of the $$y_{nP+n_d}^{k_g}$$

determined for an indexed slice $k_g$, then being given $$Y_m^{k_g,n_d} = DFT\left(y_{nP+n_d}^{k_g}\right),$$

$n_0 \in [[0; P-1]]$ and then determining the index $m_g \in [[0; N-1]]$ of the maximum of the modulus of $$Y_m^{k_g,n_d},$$

i.e.

$$m_d = \arg\max_m \left| X_m^{k_d,n_d} \right|; \text{ and}$$

determine an estimate, $\hat{f}_g$, of the value of the frequency $f_g$ with $$\hat{f}_g = \begin{cases} \dfrac{m_g}{NT} & \text{if } m_g < \dfrac{N}{2} \\[2mm] \dfrac{m_g}{NT} - \dfrac{1}{T_s} & \text{if } m_g \geq \dfrac{N}{2} \end{cases} .$$

9. The device according to claim 8, configured to determine an estimate $\hat{\Delta f}$ of the frequency shift $\Delta f$ utilizing the following formula:

$$\hat{\Delta f} = \frac{\hat{f}_d + \hat{f}_g}{2}.$$

10. The device according to claim 8, configured to, when $m_d$ and $m_g$ do not have the same parity, modify the value of that of $m_d$ and $m_g$ whose second largest Fourier-transform value is closest to the maximum, the value of the modified index being set equal to the index of this second value.

* * * * *